United States Patent [19]
Nath

[11] 3,878,721

[45] Apr. 22, 1975

[54] ARRANGEMENT FOR MEASURING THE TEMPERATURE OF A MOVING OBJECT

[75] Inventor: Günther Nath, Munich, Germany

[73] Assignee: J. M. Voith GmbH, Heidenheim, Brenz, Germany

[22] Filed: Mar. 29, 1973

[21] Appl. No.: 346,826

[30] Foreign Application Priority Data
Apr. 1, 1972  Germany............................ 2216091

[52] U.S. Cl.................... 73/351; 73/362 R; 323/53; 336/110; 336/123; 336/179; 340/189 MB; 340/210
[51] Int. Cl......................... G01k 7/16; G01k 13/08
[58] Field of Search............ 73/351, 362 R, 362 CP; 323/52, 53, 113; 340/189 MB, 195, 210; 336/110, 120, 121, 122, 123, 129, 179

[56] References Cited
UNITED STATES PATENTS

| | | | |
|---|---|---|---|
| 2,066,777 | 1/1937 | Harnett........................... | 336/129 X |
| 2,447,566 | 8/1948 | Decker et al. ................ | 340/195 UX |
| 2,894,231 | 7/1959 | Krasno........................... | 336/123 X |
| 3,112,070 | 11/1963 | Seney.............................. | 73/351 X |
| 3,179,909 | 4/1965 | Cheney............................. | 336/120 |
| 3,268,880 | 8/1966 | Miller .............................. | 73/351 X |

OTHER PUBLICATIONS
NBS Technical News Bulletin: Turbine Blade Temperature Telemeter, Dec. 1954, pp. 180–183.

*Primary Examiner*—Richard C. Queisser
*Assistant Examiner*—Frederick Shoon
*Attorney, Agent, or Firm*—Michael S. Striker

[57] ABSTRACT

The arrangement for measuring the temperature of a moving object including a temperature-responsive circuit at least part of which is located on the object. The circuit including a moving inductor unit mounted for movement with the object along a predetermined path of motion. A stationary first unit applies an input signal to the temperature-responsive circuit to cause the same to generate a temperature-dependent output signal. A stationary second unit is responsive to the temperature-dependent output signal, and includes a measuring unit for determining the temperature of the object by measuring the response of the second unit to the temperature-dependent output signal. At least one of said first and second units comprises a stationary inductor unit. One of said inductor units comprises at least one pair of spaced electrically connected inductor coils; the other of the inductor units comprises an additional inductor coil. The inductor coils are so oriented that when said object moves in said predetermined manner, the moving inductor unit passes by the stationary inductor unit to establish inductive coupling between said pair of inductor coils and said additional inductor coil. The coils are furthermore so oriented that a change in the orientation of the path of motion of the moving inductor unit with respect to the stationary inductor unit causes a decrease in the maximum coupling between said additional coil and one coil of said pair of coils and concomitantly causes an increase in the maximum coupling between said additional coil and the other coil of said pair of coils, to compensate for said decrease.

42 Claims, 6 Drawing Figures

ARRANGEMENT FOR MEASURING THE TEMPERATURE OF A MOVING OBJECT

BACKGROUND OF THE INVENTION

The invention relates to arrangements for measuring the temperature of a moving object. More particularly, the invention relates to arrangements for this purpose of the type including a temperature-responsive circuit at least part of which is located on the object itself, and stationary means for applying an input signal to the temperature-responsive circuit, usually by inductive coupling to avoid physical contact with moving components. Such arrangements usually include further stationary means for responding to the temperature-dependent output signal furnished by such circuits, the stationary means just mentioned likewise usually employing the expedient of inductive coupling, to avoid physical contact with moving components. Typically, an input transformer and an output transformer are employed for coupling a signal into the moving circuit and for coupling a signal out of the moving circuit, with a suitable measuring instrument cooperating with the output transformer to measure the temperature of the object by measuring the output signal.

The problem of measuring the temperature of a moving object without having to establish physical contact with the object itself occurs very frequently in engineering. Pyrometers are usually used for this purpose when high temperatures are involved. However, these pyrometers operate very inaccurately and unreliably when temperatures less than 500°C are involved.

A particular instance when such a temperature range is involved is encountered in the making of paper where it is necessary to monitor the temperature of the paper drying cylinders to prevent overheating of the same.

Known measuring devices suffer from the disadvantage of being either too expensive and/or difficult to install and maintain for most applications, or else of being simply too inaccurate to be really useful. Furthermore, known arrangements for measuring the temperature of a moving object are ususally suitable for only one specific context of use.

An already known arrangement of the type in question operates without physical contact and is used for monitoring the temperature of a rotating object, such as a rotating shaft. A bridge circuit comprising fixed resistors and also temperature-responsive resistors is mounted on the rotating object, the bridge circuit being supplied with energy by means of an input transformer and delivering a temperature-dependent output signal to a measuring device by means of an output transformer. The input transformer and the output transformer each comprises two coils which are coaxial with the rotational axis of the rotating shaft, one of the coils of each transformer being stationary and the other mounted on the shaft for rotation therewith. A system of this kind exhibits the serious disadvantage that it cannot be used for performing precise temperature measurements over a wide range of temperatures, because the thermal elongation and shortening of the shaft which occurs when wide temperature ranges are involved changes the coupling of the stationary and moving coils of each of the two transformers, so that a reliable frame of reference cannot be established, and the output signals measured are largely without significance, in so far as a precise and accurate indication of temperature changes is concerned. Also, the prior-art device is so designed that it is limited in its usefulness to the situations where the temperature of rotating objects is to be measured. Also, the installation of the known measuring devices on existing machines not already provided with them can be very difficult and costly.

The prior art also discloses an arrangement in which the measuring circuit again has the form of a bridge circuit disposed on the rotating object and including temperature-dependent resistors. A signal is inductively coupled via an input transformer into the bridge circuit and an output signal delivered to a measuring device by inductive coupling, using an output transformer. The signal which is coupled into the bridge circuit is generated by a variable-frequency generator whose frequency is varied until the measuring device detects conincidence between the frequency of the coupled signal and the natural frequency of the bridge circuit, such natural frequency being a function of temperature due to the inclusion of the temperature-dependent resistors. A system of this type requires relatively complex electronic circuitry. Moreover, for each measurement to be taken, the bridge circuit must be balanced, and this is a relatively time-consuming and annoying procedure.

The field of the present invention is not limited to the measurement of the temperature of rotating objects, nor even to the measurement of the temperature of periodically moving objects in general. However, when rotating objects are involved, a satisfactory temperature-measuring arrangement should exhibit as many of the following characteristics as possible:

[1] It should be able to measure the temperature of the object without physically contacting the same.

[2] The temperature should be measured at a location which is of significance in the manufacturing process, for instance at the surface of a rotating cylinder if such cylinder carries a web of material being processed.

[3] The temperature should be accurate to within 1°C.

[4] The rotating part of the measuring arrangement should not contain any active components, such as batteries or fuel cells, and should only contain passive elements. The number of moving parts should be kept as low as possible.

[5] The result of the measurement should be independent of dimensional changes of the object caused by thermal expansion or contraction.

[6] The measured value should be independent of the rotational speed of the object.

[7] The arrangement should be as inexpensive and simple as possible, because it is often desired to provide a plurality of such arrangements for a single object, to measure the temperature of the object at a plurality of locations.

SUMMARY OF THE INVENTION

It is the general object of the present invention to provide an arrangement for measuring the temperature of a moving object which avoids the disadvantages of the known devices and meets most or all of the requirements enumerated above.

It is another object of the present invention to provide an arrangement of the type in question which can be used for measuring the temperature of rotating objects, non-rotating but periodically moving objects such as reciprocating objects, and also objects moving in a non-periodic manner.

These objects, and others which will become more understandable from the following description, can be met according to the invention by an arrangement for measuring the temperature of an object mounted for movement in a predetermined manner. The arrangement includes a temperature-responsive circuit at least part of which is located on the object and includes moving inductor means mounted for movement with the object along a predetermined path of motion. The arrangement includes stationary first means for applying an input signal to the temperature-responsive circuit to cause the same to generate a temperature-dependent output signal. Stationary second means in responsive to the temperature-dependent output signal and includes measuring means for determining the temperature of the object by measuring the response of the second means to said temperature-dependent output signal. At least one of the first and second means includes stationary inductor means. One of the stationary and moving inductor means comprises at least one pair of spaced electrically connected inductor coil means, and the other of said stationary and moving inductor means comprises an additional inductor coil means. The inductor coil means are so oriented that upon movement of the object in said predetermined manner, the moving inductor means passes by the stationary inductor means to establish inductive coupling between said pair of inductor coil means and said additional inductor coil means, and said coil means being furthermore so oriented that a change in the orientation of the path of motion of said moving inductor means with respect to said stationary inductor means causes a decrease in the maximum coupling between said additional coil means and one coil means of said pair of coil means and concomitantly causes an increase in the maximum coupling between said additional coil means and the other coil means of said pair of coil means, to compensate for said decrease.

An arrangement embodying the concepts of the invention permits precise measurement of temperature over a wide range of temperature variations, and is nevertheless extremely simple and inexpensive to manufacture and install. The installation costs are low, and the installation requires very little skill and does not involve the meeting of fine tolerance requirements. Furthermore, the inventive arrangements are characterized by being unaffected by dimensional changes of the moving object or the mounting means for object due to thermal expansion and contraction or to mechanical wear. Also, the relative orientation between the object whose temperature is to be measured and the measuring arrangement, both the moving and stationary parts of the latter, need not be particularly exact, and variations in such relative orientation have virtually no effect on the results of the measurement. The arrangement according to the invention are so simple that they can be readily provided on already manufactured equipment, and they can be used to measure the temperature of rotating objects, non-rotating objects which move in periodic manner, and objects which move in non-periodic manner.

It is advantageous, but not absolutely necessary, according to the invention for the arrangement to include an input transformer and an output transformer, for the coupling of a singal into the temperature-responsive circuit and for the coupling of a signal out of the temperature-responsive circuit. If there is no time-lag between the generation of the input and output signals, then it is advantageous if the transformer components are so oriented that when the object moves in the predetermined manner for which it is mounted the mutual inductances of the two transformers reach their respective maximum values simultaneously.

The novel features which are considered characteristic for the invention are set forth in particular in the appended claims. The invention itself, however, both as to its construction and its method of operation, together with additional objects and advantages thereof, will best be understood from the following description of specific embodiments, when read in connection with the accompanying drawing.

DESCRIPTION OF THE PREFERRED EMBODIMENTS

Figure 1:
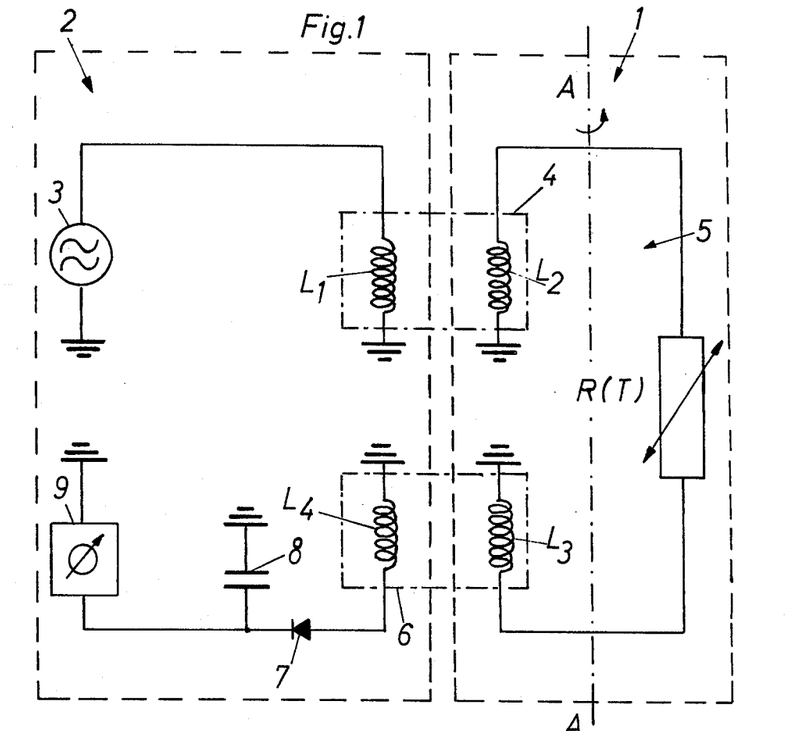
FIG. 1 is a schematic circuit diagram showing the principle of operation of a temperature measuring arrangement.

FIG. 1 shows in schematic form an arrangement for measuring the temperature of a moving object, embodying the concept of the invention. The part of the arrangement generally designated by numeral 1 is disposed on or is mounted for movement with a rotating drying cylinder of a paper-making machine, which is the object whose temperature is to be measured in the illustrated embodiments. The part of the arrangement generally designated by reference numeral 2 is stationary with respect to the rotating drying cylinder.

The part of the arrangement designated by reference numeral 1 includes a temperature-responsive circuit 5 including two moving means $L_2$ and $L_3$ mounted for movement with the rotating drying cylinder along a predetermined path of motion, namely along a circular path of motion. These two moving inductor means $L_2$ and $L_3$ are connected inn series with a temperature-dependent resistor $R(T)$. The resistor $R(T)$ is preferably selected for the maximum possible change of resistance value with change of temperature. Thermistors are therefore particularly suitable for the temperature-responsive measuring circuit 5. The temperature-dependent resistor $R(T)$ is located near the external surface of the drying cylinder to provide the truest possible measurement of the surface temperature of the drying cylinder.

The stationary part of the arrangement, generally designated by reference numeral 2, includes stationary first means for applying an input signal to the temperature-responsive circuit 5. This stationary first means comprises a source 3 of periodic current, e.g. A.C. current or pulsating D.C. current, connected to a stationary inductor means $L_1$. The moving inductor means $L_2$ is so mounted on the rotating cylinder that upon rotation of the cylinder, the moving inductor means $L_2$ passes by the stationary inductor means $L_1$ and establishes coupling between $L_1$ and $L_2$. In this manner, the stationary first means 3, $L_1$ applies an input signal to the temperature-responsive circuit 5. This input signal generates a voltage across stationary inductor means $L_2$ and causes a flow of current through series-connected resistor $R(T)$ and moving inductor means $L_3$, this current having an amplitude which is dependent upon the resistance value of resistor $R(T)$. The flux generated by moving inductor means $L_3$ accordingly constitutes a temperature-dependent output signal. It will be appreciated that stationary inductor means $L_1$ and moving inductor means $L_2$ accordingly together constitute an input transformer 4, this being indicated by the dash-dotted lines surrounding the components $L_1$ and $L_2$ in FIG. 1.

The stationary part of the arrangement, generally designated with reference numeral 2, furthermore includes stationary second means responsive to the temperature-dependent output signal generated by the temperature-responsive circuit 5. This stationary second means includes stationary inductor menas $L_4$, rectifying diode 7, integrating or smoothing capacitor 8, and a measuring instrument 9. Upon rotation of the drying cylinder, the moving inductor means $L_3$, whose periodically varying flux constitutes a temperature-dependent output signal, will pass by stationary inductor means $L_4$, and will induce a voltage across stationary inductor means $L_4$. The voltage across $L_4$ will be an A.C. voltage. In order to measure the response of stationary inductor means $L_4$ to the temperature-dependent flux of moving inductor means $L_3$, a rectifying diode 7 and an integrating or smoothing capacitor 8 are connected to the stationary inductor means $L_4$. The voltage developed across smoothing capacitor 8 will be a relatively smooth D.C. voltage whose amplitude is a function of the resistance value of resistor $R(T)$. Connected across smoothing capacitor 8, for measuring purposes, is a measuring instrument 9, which may for instance be a galvanometer. For the sake of simplicity the dial of the galvanometer 9 can be calibrated in degrees of temperature. Such calibration facilitates the taking of the temperature and permits simple compensation for any non-linearities in the temperature-dependence of the resistor $R(T)$, in the event for example that the resistor $R(T)$ has an exponential or other non-linear response to temperature.

It will be noted that the stationary inductor means $L_4$ and the moving inductor means $L_3$ together form an output transformer 6, when the drying cylinder has rotated to a position in which coupling is establishing between inductor means $L_3$ and $L_4$.

Advantageously, the moving inductor means $L_2$ is so mounted with respect to the stationary inductor means $L_1$, and the moving inductor means $L_3$ is so mounted with respect to the stationary inductor means $L_4$, that when the drying cylinder rotates the mutual inductance or coupling of the input transformer 4 reaches the maximum value at substantially the same moment that the mutual inductance of the output transformer 6 reaches its respective maximum value. Specifically, during rotation of the drying cylinder, the moving inductor $L_2$ passes by the stationary inductor means $L_1$ at substantially the same time that the moving inductor means $L_3$ passes by the stationary inductor means $L_4$.

It is noted at this point that with respect to the stationary first means 3, $L_1$ it is not necessary to provide an active electrical voltage or current source, such as source 3, in order to couple an input signal into the measuring circuit 5. Other expedients will be discussed below. Furthermore, while the source 3 illustrated is continuously operative, it may be more advantageous to provide a source whose operation is synchronized to establish flow of periodic current through the inductor means $L_1$ only during the time moving inductor means $L_2$ passes by $L_1$, to conserve power. Likewise, the use of a measuring instrument such as a galvanometer is obviously not the only possibility. Any suitable measuring instrument may be used, for instance an oscilloscope or other type of measuring instrument, and the rectifier 7 and capacitor 8 may be omitted when other types of measuring instruments are employed.

Figure 2:
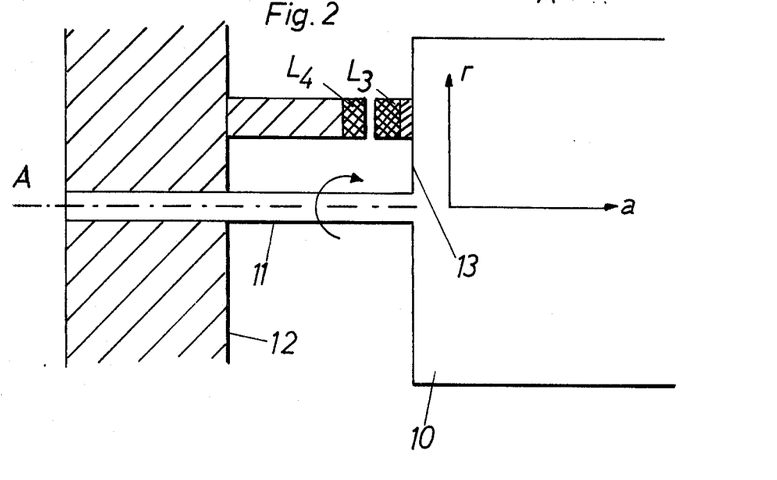
FIG. 2 is a diagrammatic view of a rotating drying cylinder of a paper-making machine with a transformer comprising two coils, to explain the changes of distance between the coils resulting from temperature changes.

One of the principal difficulties with arrangements of the type shown in FIG. 1 can best be understood by reference to FIG. 2. FIG. 2 shows only the output transformer 6, consisting of the moving inductor $L_3$ and the stationary inductor means $L_4$. The moving inductor means $L_3$ is mounted for movement with the drying cylinder 10 about the axis A—A (see FIG. 1). In order to obtain reliable indications of the temperature of the cylinder surface, it is necessary that the coupling (i.e., mutual inductance) between the moving inductor means $L_3$ and the stationary means $L_4$ be independent of changes in the temperature of the cylinder 10. However, this is very difficult to achieve because the drying cylinder 10 undergoes considerably dimensional changes, both in axial and radial direction, due to thermal expansion and contraction. These dimensional changes are more than enough to make the voltage generated across the stationary inductor means $L_4$ a very inaccurate indication of the temperature-responsive flux generated by moving means $L_3$.

In the structural example shown in FIG. 2, the drying cylinder 10 has a mounting shaft 11 which is journalled in a stationary bearing 12. A similar mounting shaft and stationary bearing are provided at the other (non-illustrated) end of the drying cylinder 10. However, the illustrated shaft 11 is so journalled in the bearing 12 that the left end of the shaft 11 cannot move from its illustrated position, even when the drying cylinder 10 and shaft 11 undergo dimensional changes due to thermal expansion and contraction. However, the other (non-illustrated) mounting shaft and stationary bearing, provided at the other end of cylinder 10, is so designed that the (non-illustrated) mounting shaft can slide in longitudinal direction through its respective journal, in response to dimensional changes of the cylinder 10 and mounting shafts in axial direction.

To see why temperature-measuring arrangements employing stationary and moving inductor means like those shown in FIG. 2 are subject to inaccuracies, consider what happens when the temperature of the drying cylinder 10 increases. The drying cylinder, usually made of cast iron or similar material, will elongate in axial direction, and so will its mounting shaft 11. Accordingly, the orientation of the path of motion of moving inductor means $L_3$, which is mounted on the left end face 13 of the cylinder, will change with respect to the stationary inductor means $L_4$ in a sense reducing the maximum coupling achieved between them during cylinder rotation. Also, a rise of temperature will cause expansion of the cylinder 10 in radial direction, causing radial shifting of the path of motion of $L_3$ with respect to $L_4$, this shifting also contributing to the decrease in the maximum coupling achieved between $L_3$ and $L_4$ during cylinder rotation. (The axial direction is referenced by arrow $a$, and the radial direction is referenced by arrow $r$).

The undesired change in coupling between $L_3$ and $L_4$ resulting from dimensional changes of the cylinder 10 in radial direction thereof can be reduced to a negligible degree of positioning the stationary inductor means $L_4$ and the moving inductor means $L_3$ as near to the axis of rotation A—A as possible.

However, the undesired changes in coupling between $L_3$ and $L_4$ resulting from dimensional changes of the cylinder 10 in axial direction are not so easily counteracted, and unless the effect of such dimensional changes in counteracted the measurements taken will have very little significance.

Figure 3:
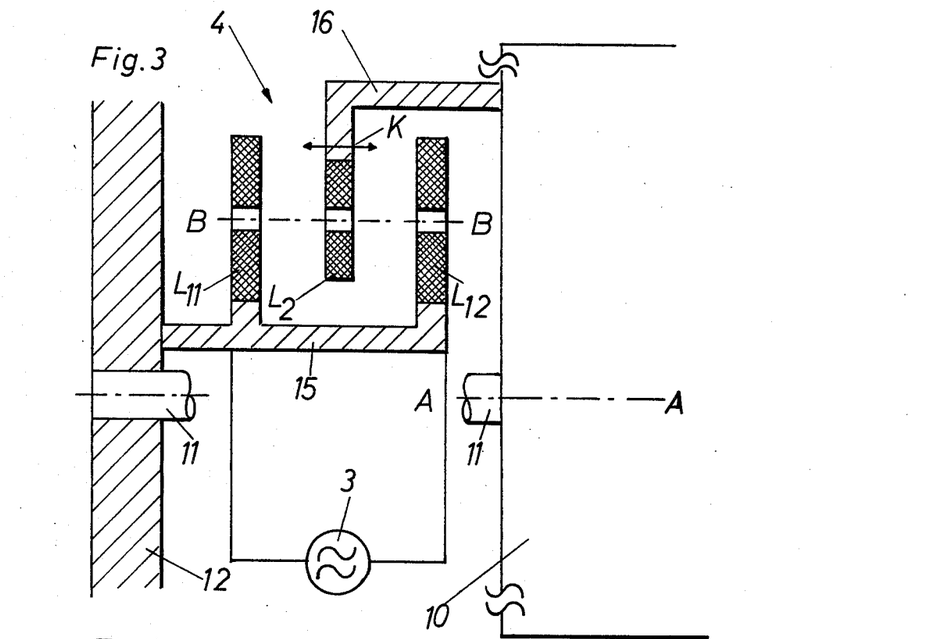
FIG. 3 shows one embodiment of the present invention.
Figure 6:
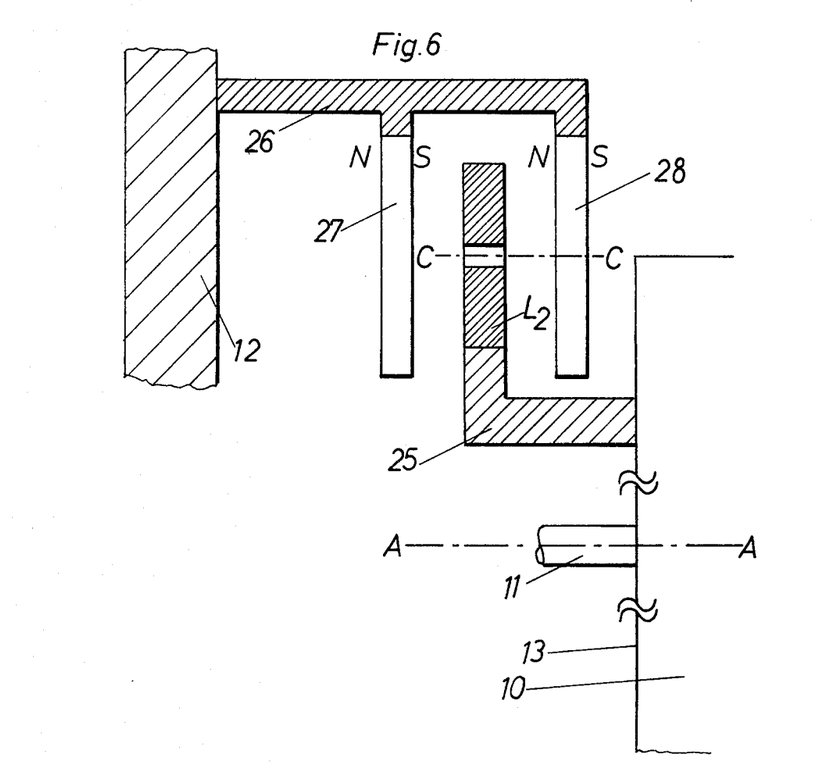
FIG. 6 shows a still further embodiment according to the present invention.

FIG. 3 shows an expedient according to the present invention for counteracting the effect upon coupling of dimensional changes of the cylinder in the axial direction thereof. FIG. 3 shows the concept of the invention applied to the input transformer 4 of the arrangement shown in FIG. 1. However, the concept illustrated in FIG. 3 may instead be applied to the output transformer 6 of FIG. 1, or both the input transformer 4 and also the output transformer 6.

In the embodiment of FIG. 3, the stationary inductor means $L_1$ of FIG. 1 is so designed as to be comprised of a pair of spaced inductor coil means $L_{11}$ and $L_{12}$ series connected and wound in additive manner. The moving inductor means $L_2$ of FIG. 1 has, in the embodiment of FIG. 3, the form of a single further inductor coil means $L_2$ mounted on the cylinder 10 for movement through the space between inductor coil means $L_{11}$ and inductor coil means $L_{12}$. The inductor coil means $L_{11}$ and $L_{12}$ are mounted on a supporting arm 15 rigidly connected to the stationary bearing 12. The inductor coil means $L_{11}$ and the inductor coil means $L_{12}$ are coaxial with each other and have axes lying on line B—B. Axis B—B is substantially parallel to the rotational axis A—A of the drying cylinder 10. Preferably, the two inductor coil means $L_{11}$ and $L_{12}$ have the same diameter, but this is not absolutely necessary, because a change of the number of coil turns, for example, could result in two inductor means $L_{11}$, $L_{12}$ of different diameter having substantially the same response to flux changes.

Further inductor coil means $L_2$, in the embodiment of FIG. 3, is also of substantially annular configuration and has an axis which is coincident with the axes of inductor coil means $L_{11}$, $L_{12}$ when the drying cylinder assumes the angular thereof in which the coupling between the stationary inductor means and the moving inductor means is maximum. The orientation of the moving inductor means $L_2$ with respect to the stationary inductor means $L_{11}$, $L_{12}$ is such that at a particular temperature of the drying cylinder (for example the temperature at which the drying cylinder is usually maintained for optimal performance) the further inductor coil means $L_2$ moves equidistantly between the pair of spaced inductor coil means $L_{11}$ and $L_{12}$. The inductor coil means $L_2$ in FIG. 3 preferably has a diameter smaller than that of inductor coil means $L_{11}$ and $L_{12}$, the smaller diameter preferably being equal to or less than half the larger diameter. Preferably, the coils $L_{11}$ and $L_{12}$ are spaced apart in axial direction by a distance substantially equal to their radii.

The arrangement shown in FIG. 3 has the great advantage that the maximum coupling of the input transformer 4 illustrated in FIG. 3 changes hardly at all when the drying cylinder 10 undergoes dimensional changes in the axial direction thereof. If the cylinder 10 undergoes an axial elongation or contraction, the path of the moving inductor means $L_2$ will certainly change with respect to the stationary inductor means $L_{11}$, $L_{12}$. However, the maximum coupling between the stationary and moving inductor means will be changed very little. The inductor coil means $L_2$ will simply pass at a greater distance from one of coil means $L_{11}$, $L_{12}$, causing a decrease in the coupling between the moving and stationary inductor means. However, concomitantly, the inductor coil means $L_2$ will pass closer to the other of the coil means $L_{11}$, $L_{12}$ causing a superimposed increase in the coupling between the moving and stationary inductor means, to compensate for the justmentioned decrease. Inasmuch as the two inductor coil means $L_{11}$ and $L_{12}$ are series-connected in voltage-additive relationship, the coupling between the moving and stationary inductor means will be almost independent of axial elongation and contraction of the drying cylinder 10 and its mounting shafts 11. Thus, the source 3 of periodic current will always couple substantially the same input signal into the temperature-responsive circuit 5, despite even very considerable dimensional changes of the drying cylinder 10 and its mounting shaft 11. This is a highly advantageous result, adding very greatly to the accuracy of the temperature-measuring arrangement.

A practical system may have the following values for the electrical circuit components:

| | | |
|---|---|---|
| diameter of coils $L_{11}$, $L_{12}$ | = | 32 mm |
| thickness of coils $L_{11}$, $L_{12}$ | = | 10 mm |
| inductance of coils $L_{11}$, $L_{12}$ | = | 270 microhenries |
| diameter of coil $L_2$ | = | 14 mm |
| thickness of coil $L_2$ | = | 10 mm |
| inductance of coil $L_2$ | = | 100 microhenries |

Figure 4:
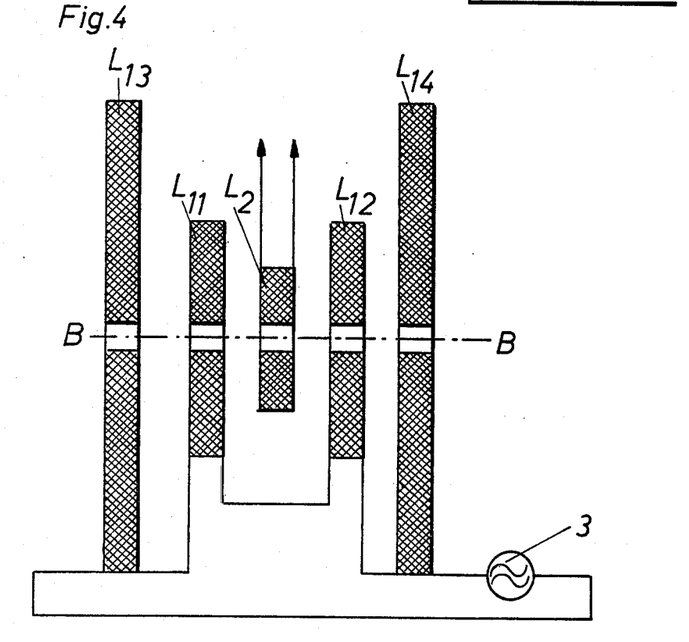
FIG. 4 shows a part of another embodiment of the present invention.

FIG. 4 shows an improvement upon the embodiment of FIG. 3. The stationary inductor means of the input transformer 4 again includes a pair of spaced inductor coil means $L_{11}$ and $L_{12}$. However, the stationary inductor means of the input transformer 4 here includes a further pair of spaced inductor coil means $L_{13}$, $L_{14}$, the inductor coil means of this further pair being located to either side of the inductor coil means of the first-mentioned pair $L_{11}$, $L_{12}$. The diameter of inductor coil means $L_{13}$, $L_{14}$ is substantially larger than the diameter of the inductor coil means $L_{11}$, $L_{12}$, but the inductor coil means $L_{13}$, $L_{14}$ are coaxial with the inductor coil means $L_{11}$, $L_{12}$. The inductor coil means $L_{13}$, $L_{14}$, are also mounted on the stationary bearing 12 (in non-illustrated manner).

In the embodiment of FIG. 4, the coils $L_{11}$, $L_{12}$ have the same radius and are spaced from each other in axial direction by a distance substantially equal to this radius. The same relationship holds between the further coils $L_{13}$ and $L_{14}$. The coils $L_{11}$, $L_{12}$, $L_{13}$ and $L_{14}$ are connected together in series in voltage-additive manner.

Figure 5:
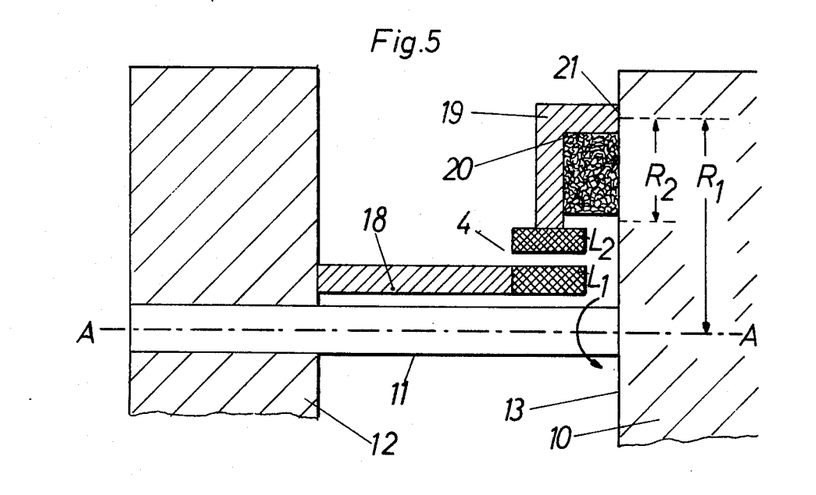
FIG. 5 shows part of a further embodiment of the present invention.

FIG. 5 illustrates another manner of maintaining constant the maximum coupling achieved between the stationary inductor means and the moving inductor means during rotation of the cylinder, despite dimensional variations of the cylinder and its mounting shafts.

In FIG. 5 there is illustrated only the input transformer 4 of the arrangement shown schematically in FIG. 1. In FIG. 5, the input transformer 4 is comprised of a stationary inductor means $L_1$ and a moving inductor means $L_2$. In FIG. 5, both the stationary and moving inductor means each consist of only a single inductor coil. The expedient which in FIG. 5 is applied only to the input transformer 4 may alternatively be applied to the output transformer 6, or may be applied to both the input transformer 4 and also the output transformer 6.

For purposes of explaining the operation of the arrangement shown in FIG. 5, it will be assumed that the change in maximum coupling achieved between $L_1$ and $L_2$ due to dimensional changes of the cylinder in axial direction is negligible compared to the change in coupling due to dimensional changes of the cylinder in radial direction. Although only one dimension will be considered, compensation for dimensional changes in two or three dimensions will be accomplished in analogous manner.

In FIG. 5, the stationary inductor means $L_1$ of the input transformer 4 is mounted in proper orientation by a supporting arm 18 rigidly connected to the stationary bearing 12. The moving inductor means $L_2$ of the input transformer 4 is mounted by L-shaped temperature-responsive supporting member 19 for movement with the cylinder 10 along a predetermined path of motion, namely along a circular path of motion. The temperature-responsive supporting member 19 has a fixed end 21 which is fixedly connected to the end face 13 of the drying cylinder 10. The supporting member 19 furthermore has a free end at which is mounted the moving inductor means $L_2$. A mass 20 of material having high thermal conductivity is provided between the supporting member 19 and the end face 13 of the cylinder 10, so as to always maintain the material of the supporting member 19 at substantially the same temperature as the material of the drying cylinder 10. At least the radially extending portion of the supporting member 19 is comprised of a material having a higher mean thermal expansion coefficient than that of the material of which cylinder 10 is comprised.

As mentioned before, it is being assumed for simplicity that only dimensional changes of cylinder 10 in radial direction present a problem. It will be seen from FIG. 5 that the member 19 has a portion which extends in radial direction. Moreover, the free end of the member 19 is spaced from the fixed end thereof in a direction opposite that in which the fixed end will move when the radial dimension of the cylinder 10 increases. In other words, if the temperature of the cylinder 10 increases, the temperature of the material of supporting member 19 will also increase, due to thermal conduction by heat-transmitting body 20. The free end of the member 19 will move with respect to the fixed end 21 thereof in a direction (radially inwards) opposite the direction in which the fixed end 21 moves. If the coefficients of thermal expansion of the materials of the member 19 and the cylinder 10 are suitably chosen, the distance by which the free end of the member 19 moves radially inwardly with respect to the fixed end 21 can be made substantially equal to the distance by which the free end 21 moves radially outwardly upon radial expansion of the cylinder 10. The net result of these opposing expansions is that the radial clearance between the moving inductor means $L_2$ and the stationary inductor means $L_1$ will be maintained substantially constant.

For the radial clearance between $L_1$ and $L_2$ to be maintained as nearly constant as possible, certain specific relationships must exist between the coefficients of thermal expansion of the two different materials and the dimensions of the supporting arm and the location of the fixed end 21 — insofar as the particular embodiment of FIG. 5 is concerned. To define this relationship, it is noted that the middle of the fixed end 21 at which the supporting member 19 is fixed to the cylinder is located at a distance $R_1$ from the axis of rotation A—A, and that the middle of the fixed end 21 is located a radial distance $R_2$ from the free end of the supporting member 19. If the radial clearance between $L_1$ and $L_2$ is to be maintained as constant as possible, then $R_1$ divided by $R_2$ should be equal to the thermal-expansion coefficient of the material of member 19 divided by the thermal-expansion coefficient of the material of the cylinder 10. Expressed mathematically, the relationship should optimally be $$\frac{R_1}{R_1} = \frac{\alpha \text{member } 19}{\alpha \text{cylinder } 10}$$

where $\alpha$ indicates the coefficient of thermal expansion.

For example, if it is assumed that the drying cylinder is constructed of cast iron, the mean thermal expansion coefficient of cast iron over the temperature range of 0° to 100°C will be at $\alpha \cdot 10^6 \cdot (1/°C) = 9 \div 12$. If it is also assumed that the supporting member 19 is constructed of German silver (62 Cu, 15 Ni, 22 Zn), having a mean expansion coefficient of $\alpha \cdot 10^6 \cdot (1/°C) = 18$ over the same temperature range it means that the distances $R_1$ and $R_2$ must be selected to have the ratio $$\frac{R_1}{R_2} = \frac{\alpha \text{German silver}}{\alpha \text{cast iron}} \approx 1.8$$

The signal generating means 3 shown in FIG. 1 is operative for producing a periodic signal. In order to render the measurements independent of the rotational speed of the drying cylinder, the frequency of the signal produced by the signal generating means 3 should be so selected that the period T of the periodic signal is very small relative to the time $t$ required for the moving inductor means to move past the stationary inductor means. The particular value of $t$ to be taken into account, according to the concept of worst-case design, most of course be the particular value of $t$ occurring when the drying cylinder is operated at the highest paper feed rate. If the temperature-dependent output signal is to be made independent of the rotational frequency of the cylinder, it is necessary that source 3 generate a periodic signal having a period T, with $T \ll t$. Preferably, the minimum value of $t$, which occurs upon fastest rotation of the drying cylinder, should be one or more orders of magnitude greater than the period T.

In one test run, the transit time required for the moving inductor means to move past the stationary inductor means was 20 milliseconds. The source 3 was made to furnish a periodic signal having a frequency of 10 kHz, for that case.

If it is desired to operate the signal generating means 3 at the lowest possible frequency, then the stationary and moving inductor means should be mounted as near to the axis of rotation of the drying cylinder as possible. With such mounting, energy can be transferred into the measuring circuit 5 by the stationary first means 3, $L_1$ for a longer time $t$, than when the stationary and moving inductor means are mounted far from the axis of rotation. Accordingly, the capacitor 8 has more time to charge to the peak voltage generated across the stationary inductor means $L_4$ of the stationary second means 6–9, $L_4$. In order to obtain the largest possible change in the temperature-dependent output signal, the inductances of $L_2$ and $L_3$ should be so dimensioned that the non-inductive as well as the inductive impedance thereof is very small compared to the resistance of the resistor R(T) at the operating temperature where the resistor R(T) has the lowest resistance.

The thermistor, as is well known, is a semiconductor element whose resistance depends upon temperature in an exponential manner. The components of the measuring circuit mounted on the moving object, i.e. the rotating cylinder, should have characteristics which do not change in response to repeated temperature changes. For example, the temperature versus resistance characteristic of the thermistor, if such is employed, should not change with use, and it is advantageous to employ a thermistor which is fused into a glass bead and has already been subjected to an aging process.

Furthermore, to ensure that the voltage indicated by the voltmeter 9 is independent of the rotational frequency of the drying cylinder, it is necessary to satisfy the conditions according to which the product of the input resistance $R_i$ of the voltmeter 9 and the capacitance C of the capacitor 8 and the product of the reverse resistance $R_S$ of the rectifier diode 7 and the capacitance C of the capacitor 8 shall be substantially larger than the inverse value of the rotational frequency v. Mathematically expressed, $$R_i.C<<(1/v) \text{ and } R_S.C<<(1/v)$$

As already mentioned in the explanation of the arrangement shown in FIG. 1, it is not absolutely necessary for the stationary first means, which applies an input signal to the temperature-responsive circuit 5, to include an active source of voltage or current like the source 3, connected to a stationary inductor means $L_1$. FIG. 6 shows an alternative possiblity for the stationary first means.

In FIG. 6 the moving inductor means $L_2$ is mounted by an arm 25 and moves along a path of motion passing through the space between two permanent magnets 27, 28, which replace the two inductor coil means $L_{11}$, $L_{12}$ of FIG. 3. Components corresponding to those shown in FIG. 3 are identified by the same reference numerals as shown in FIG. 3 and will not be described again here. The moving inductor means $L_2$ of FIG. 6 is mounted by arm 25 with such an orientation that the axis C—C of moving inductor means $L_2$ is substantially parallel to the rotational axis A—A of the drying cylinder 10. The moving inductor means $L_2$ is itself disposed in a plane which extends substantially perpendicular to the axis A—A. The two bar magnets 27, 28 are mounted by an arm 26 fixedly connected to the stationary bearing 12. The bar magnets 27, 28 are spaced from each other and substantially parallel to the plane in which the coil $L_2$ is situated. (Alternatively, of course, a single unitary magnet, suitably configured, could be used instead of two distinct magnets.) The bar magnets 27 and 28 are furthermore so oriented that they face each other with poles of opposite polarity so that a homogeneous magnetic field is formed between the bar magnets. Magnets 27 and 28 are furthermore so oriented that rotation of the drying cylinder 10 causes the moving inductor means $L_2$ to pass through the gap between the magnets. The surfaces of the two magnets are preferably larger than the surface of the coil. The magnets should be strongly magnetized and have very stable magnetic characteristics, so that the magnetization does not change after prolonged use due to repeated temperature changes and exposure to high temperatures.

Changes in the axial dimensions of the cylinder 10 and its mounting shafts 11 will not make themselves felt upon the stationary first means, which in FIG. 6 is comprised of the moving inductor means $L_2$ and the two permanent magnets 27, 28. If the axial dimension of the cylinder 10 changes, the moving inductor means $L_2$ will move through a different part of the space between the two magnets 27, 28. However, inasmuch as the field between these two magnets is substantially homogeneous, the response of the inductor means $L_2$ will not be materially altered.

Each rotation of the drying cylinder and passage of the moving inductor means $L_2$ through the space between magnets 27, 28 causes a signal to be coupled into the temperature-responsive circuit 5. Clearly, the voltage peak of this signal will be greater if the moving inductor means $L_2$ moves rapidly through the space between magnets 27, 28 than if the moving inductor means $L_2$ moves slowly through such space. Accordingly, it is advantageous to provide the magnets 27, 28 and inductor means $L_2$ as far from axis A—A as possible, to obtain the strongest input signals.

It may not be immediately clear how the arrangement of FIG. 6 can provide a dependable indication of the temperature of cylinder 10, inasmuch as the input signal applied to the temperature-responsive circuit will vary as a function of the rotational speed of the cylinder. However, this variation in the amplitude of the input signal is counteracted by provision of the rectifier 7 and the integrating capacitor 8. Referring briefly to FIG. 1, and specifically to components 6–9 thereof, it will be appreciated that at the maximum cylinder speed the voltage applied to the circuit 5 (by magnets 27, 28) will be maximum, and the voltage generated across inductor $L_4$ will be maximum. On the other hand, the voltmeter 9 is not directly connected to the inductor $L_4$, but rather is connected to the same only through the intermediary of rectifier 7 and integrating capacitor 8. Although the greatest cylinder speed produces the greatest voltage across inductor $L_4$, it also results in the shortest-lasting voltage across inductor $L_4$, and accordingly gives integrating capacitor 8 the shortest time to respond to the voltage generated across inductor $L_4$. The capacitor 8, in other words, introduces sluggishness into the response of the voltmeter 9. The greater the cylinder speed, the greater the voltage across inductor $L_4$, but the shorter the time for voltmeter 9 to respond to such voltage. Conversely, lower cylinder speed results in a smaller voltage across inductor $L_4$, but a longer time for voltmeter 9 to respond to such voltage. In this way, the reading of the voltmeter 9 will depend almost exclusively on the resistance of R(T)

and will be almost entirely independent of the rotational speed of the cylinder.

It will be understood that each of the elements described above, or two or more together, may also find a useful application in other types of circuits and constructions differing from the types described above.

While the invention has been illustrated and described as embodied in an arrangement for measuring the temperature of a rotating paper-drying cylinder, it is not intended to be limited to the details shown, since various modifications and structural changes may be made without departing in any way from the spirit of the present invention.

The illustrated embodiments are but exemplary, and many modifications and reversals of parts can be effected without departing from the concepts of the present invention. For instance, in FIG. 3, one moving inductor coil $L_2$ passes between two stationary inductor coils $L_{11}$ and $L_{12}$. However, the relationship could be reversed. Two moving inductor coils could travel past a single stationary inductor coil disposed between them, and the compensation action would be identical to that accomplished with the arrangement of FIG. 3. Also, it is not absolutely necessary that one coil pass through the space defined between a pair of spaced coils, as in the embodiments illustrated. The two stationary inductor means in FIG. 3, for example, could lie in the same plane, spaced from each other, and the moving inductor means in FIG. 3 could move past them, facing them, without actually entering into a gap defined between them. The common plane in which the two stationary inductor means would lie could be either tangent to the path of motion of the moving inductor means (for compensation against axial dimensional changes) or radial (for compensation against radial dimensional changes).

Furthermore, the illustrated embodiments have made use only of different combinations of inductor coils. However, other flux-responsive means can be employed. For example, in the embodiment of FIG. 3, the two series-connected stationary inductor coil means $L_{11}$ and $L_{12}$ could be replaced by Hall generator units (semiconductor elements responsive to magnetic flux magnitude), and such Hall generator units would evidently perform in exactly the same manner as the coils $L_{11}$ and $L_{12}$ of FIG. 3.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. An arrangement for measuring the temperature of an object mounted for movement in a predetermined manner, comprising, in combination, a temperature-responsive circuit at least part of which is located on said object and including moving inductor means mounted for movement with said object along a predetermined path of motion; stationary first means for applying an input signal to said temperature-responsive circuit to cause the same to generate a temperature-dependent output signal; stationary second means responsive to said temperature-dependent output signal, and including measuring means for determining the temperature of said object by measuring the response of said second means to said temperature-dependent output signal, at least one of said first and second means comprising stationary inductor means, one of said stationary and moving inductor means comprising at least one pair of spaced electrically connected inductor coil means, and the other of said stationary and moving inductor means comprising an additional inductor coil means, said inductor coil means being so oriented that upon movement of said object in said predetermined manner said moving inductor means passes by said stationary inductor means to establish inductive coupling between said pair of inductor coil means and said additional inductor coil means, and said coil means being furthermore so oriented that a change in the orientation of the path of motion of said moving inductor means with respect to said stationary inductor means causes a decrease in the coupling between said additional coil means and one coil means of said pair of coil means and concomitantly causes an increase in the coupling between said additional coil means and the other coil means of said pair of coil means to compensate for said decrease.

2. An arrangement as defined in claim 1, said object being subject to dimensional variations in at least one dimension thereof due to thermal expansion and contraction, and wherein said stationary and moving inductor means are so oriented with respect to each other and with respect to said at least one dimension that a change in the path of motion of said moving inductor means due to a dimensional change of said object causes a decrease in the coupling between said additional inductor coil means and one of said pair of inductor coil means and concomitantly causes an increase in the coupling between said additional coil means and the other coil means of said pair of coil means to compensate for said decrease.

3. An arrangement as defined in claim 1, wherein said pair of inductor coil means are substantially coaxial and spaced from each other in axial direction, and wherein said additional inductor coil means is so mounted as to pass between said pair of inductor coil means with its axis parallel to the axes of said pair of inductor coil means during movment of said object in said predetermined manner.

4. An arrangement as defined in claim 3, wherein said moving inductor means and said stationary inductor means are so mounted that when said object moves in said predetermined manner said additional inductor coil means travels through the space between said pair of inductor coil means in direction perpendicular to the axes of said pair of inductor coil means.

5. An arrangement as defined in claim 3, wherein said pair of coils have equal diameters and are spaced from each other in axial direction by a distance substantially equal to one diameter.

6. An arrangement as defined in claim 3, wherein the one of said stationary and moving inductor means which includes said pair of inductor coil means includes a further pair of inductor coil means, the inductor coil means of said further pair being spaced from each other and located to either side of the inductor coil means of the first-mentioned pair.

7. An arrangement as defined in claim 6, wherein the two inductor coil means of said further pair are larger than the two inductor coil means of said first-mentioned pair.

8. An arrangement as defined in claim 6, wherein the inductor coil means of said further pair and the inductor coil means of said first-mentioned pair are electrically connected with one another in series.

9. An arrangement as defined in claim 1, wherein said temperature-responsive circuit includes an additional moving inductor means mounted for movement with said object, and wherein said stationary inductor means is part of said second means, and wherein said first means includes a further stationary inductor means, one of the two moving inductor means forming with the stationary inductor means of said first means an input transformer, and the other of the two moving inductor means forming with the stationary inductor means of said second means an output transformer.

10. An arrangement as defined in claim 9, wherein said input transformer and said output transformer are substantially identical.

11. An arrangement as defined in claim 9, wherein said stationary and moving inductor means are so positioned and oriented that upon movement of said object in said predetermined manner the mutual inductance of said input transformer reaches its maximum value at substantially the same time that the mutual inductance of said output transformer reaches its respective maximum value.

12. An arrangement as defined in claim 9, wherein said temperature-responsive circuit further includes a temperature-sensing element, and wherein the two moving inductor means of said temperature-responsive circuit and said temperature-sensing element are connected together in series to form a closed series circuit.

13. An arrangement as defined in claim 1, wherein said stationary inductor means is included in said first means, and wherein said moving inductor means is mounted to move past said stationary inductor means upon movement of said object in said predetermined manner, and wherein said first means establishes a flow of periodic current through said stationary inductor means, the periodic current having a period substantially smaller than the time required for said moving inductor means to move past said stationary inductor means.

14. An arrangement as defined in claim 1, wherein said measuring means is operative for measuring the amplitude of the response of said second means to said temperature-dependent output signal.

15. An arrangement as defined in claim 1, wherein said temperature-responsive circuit includes a temperature-dependent resistor located on said object.

16. An arrangement as defined in claim 15, wherein said temperature-dependent resistor is a thermistor.

17. An arrangement as defined in claim 1, wherein said stationary inductor means is included in said second means, and wherein said first means includes a pair of spaced permanent magnets, and wherein said temperature-responsive circuit includes an additional moving inductor means, wherein one of the two moving inductor means of said circuit is mounted for movement with said object along a path of motion passing between said pair of permanent magnets, and wherein the other of the two moving inductor means of said circuit is mounted for movement with said object along a path of motion passing by said stationary inductor means.

18. An arrangement as defined in claim 17, wherein said pair of permanent magnets are positioned with pole ends of opposite polarity facing each other.

19. An arrangement as defined in claim 17, wherein said pair of permanent magnets establish between them a magnetic field with the portion of the magnetic field through which the respective moving inductor means passes being substantially homogeneous.

20. An arrangement as defined in claim 17, said object being subject to dimensional changes with respect to at least one dimension thereof due to thermal expansion and contraction, and wherein said magnets are so oriented relative to the one of said moving inductor means which passes between them that a dimensional change of said object with respect to said at least one dimension changes the path of motion of the respective moving inductor means in such a manner that the latter passes closer to one of said magnets than to the other of said magnets.

21. An arrangement as defined in claim 17, wherein said measuring means comprises means for rectifying and integrating the voltage generated across said stationary inductor means upon passage thereby of said other of the two moving inductor means of said temperature-responsive circuit.

22. An arrangement as defined in claim 1, said object being the drying cylinder of a paper-making machine.

23. An arrangement for measuring the temperature of an object mounted for movement in a predetermined manner, comprising, in combination, a temperature-responsive circuit at least part of which is located on said object and including moving inductor means mounted for movement with said object along a predetermined path of motion; stationary first means for applying an input signal to said temperature-responsive circuit to establish a flow of temperature-dependent current through said moving inductor means; stationary second means responsive to the flux produced by said current and including measuring means for determining the temperature of said object by measuring the response of said second stationary means to said flux, said second stationary means including flux-responsive means responsive to said flux generated by said moving inductor means, one of said moving inductor means and said flux-responsive means comprising two spaced parts, and the other of said moving inductor means and said flux-responsive means comprising a further part, said parts being so oriented that, upon movement of said object in said predetermined manner, said further part comes into operative proximity to both of said two spaced parts, with the response to flux of said flux-responsive means accordingly having two superimposed components, said two spaced parts and said further part being moreover so oriented that a change in the orientation of the path of motion of said inductor means with respect to said flux-responsive means causes said further part to come into greater proximity to one of said two spaced parts and into lesser proximity to the other of said two spaced parts, causing a decrease in one of said two components of response and a concomitant increase in the other of said two components of response, to compensate for said decrease.

24. An arrangement as defined in claim 23, said object being subject to dimensional variations in at least one dimension thereof due to thermal expansion and contraction, and wherein said moving inductor means and said flux-responsive means are so oriented with respect to each other and with respect to said at least one dimension that a change in the path of motiion of said moving inductor means due to a dimensional change of said object causes said further part to come into greater proximity to one of said two spaced parts and into lesser proximity to the other of said two spaced parts, causing a decrease in one of said two components of response and a concomitant increase in the other of said two components of response, to compensate for said decrease.

25. An arrangement for measuring the temperature of an object mounted for movement in a predetermined manner but subject to dimensional variations with respect to at least one dimension thereof due to thermal expansion and contraction, comprising, in combination, a temperature-responsive circuit at least part of which is located on said object and including moving inductor means; stationary first means for applying an input signal to said temperature-responsive circuit to cause the same to generate a temperature-dependent output signal; stationary second means responsive to said temperature-dependent output signal, and including measuring means for determining the temperature of said object by measuring the response of said second means to said temperature-dependent output signal, at least one of said first and second means comprising stationary inductor means; and temperature-responsive supporting means on said object connecting said moving inductor means to said object for movement with the latter along a predetermined path of motion and supporting said moving inductor means with such an orientation with respect to said stationary inductor means that upon movement of said object in said predetermined manner said moving inductor means passes by said stationary inductor means to establish inductive coupling between said moving and stationary inductor means, said temperature-responsive supporting means being automatically operative when said object undergoes a dimensional change in at least one direction with respect to said at least one dimension for moving said moving inductor means relative to said object in the direction opposite to said at least one direction to maintain constant the coupling between said stationary and moving inductor means.

26. An arrangement as defined in claim 25, wherein said temperature-responsive supporting means comprises a supporting member fixed at one end to said object for movement therewith, and wherein said supporting member has a free other end at which is mounted said moving inductor means, and wherein said supporting member extends from the fixed end thereof to said free end in such a direction that upon similar changes of temperature of said object and said member said free end moves with respect to said fixed end in a direction opposite that in which said fixed end moves.

27. An arrangement for measuring the temperature of an object mounted for movement in a predetermined manner but subject to dimensional variations with respect to at least one dimension thereof due to thermal expansion and contraction, comprising, in combination, a temperature-responsive circuit at least part of which is located on said object and including moving inductor means; stationary first means for applying an input signal to said temperature-responsive circuit to cause the same to generate a temperature-dependent output signal; stationary second means responsive to said temperature-dependent output signal, and including measuring means for determining the temperature of said object by measuring the response of said second means to said temperature-dependent output signal, at least one of said first and second means comprising stationary inductor means; and temperature-responsive supporting means connecting said moving inductor means to said object for movement with the latter along a predetermined path of motion and supporting said moving inductor means at such an orientation with respect to said stationary inductor means that upon movement of said object in said predetermined manner said moving inductor means passes by said stationary inductor means to establish inductive coupling between said moving and stationary inductor means, said temperature-responsive supporting means being automatically operative when said object undergoes a dimensional change with respect to said at least one dimension for altering the orientation of said moving inductor means with respect to said object in such a manner as to tend to maintain constant the maximum coupling between said stationary and moving inductor means, said object being mounted for rotation about a predetermined axis, and wherein said support member extends from said fixed end to said free end in direction substantially radially with respect to said axis, and wherein said object and said member are comprised of respective materials having respective different coefficients of thermal expansion, and wherein the thermal coefficient of the material of said member divided by the thermal coefficient of the material of said object is substantially equal to the radial distance of said fixed end from said axis divided by the radial distance of said fixed end from said free end.

28. An arrangement as defined in claim 27, wherein said stationary inductor means is part of said first means, and wherein said second means includes a further stationary inductor means, and wherein said temperature-responsive circuit includes a further moving inductor means; and further including an additional temperature-responsive supporting means connecting said further moving inductor means to said object for movement with the latter along a predetermined path of motion and supporting said further moving inductor means at such an orientation with respect to said further stationary inductor means that upon movement of said object in said predetermined manner said further moving inductor means passes by said further stationary inductor means to establish inductive coupling between said further moving inductor means and said further stationary inductor means, said further temperature-responsive supporting means being automatically operative when said object undergoes a dimensional change with respect to said at least one dimension for altering the orientation of said further moving inductor means with respect to said object in such a manner as to tend to maintain constant the coupling between said further stationary inductor means and said further moving inductor means.

29. An arrangement as defined in claim 28, wherein the stationary inductor means of said first means forms with the first-mentioned one of the two moving inductor means of said circuit an input transformer, and wherein said further stationary inductor means forms with said further moving inductor means an output transformer.

30. An arrangement as defined in claim 29, wherein the two moving inductor means and the two stationary inductor means are so oriented that when said object moves in said predetermined manner the mutual inductance of said input transformer reaches its maximum value at substantially the same time as the mutual inductance of said output transformer reaches its respective maximum value.

31. An arrangement as defined in claim 25, wherein said stationary inductor means comprises an inductor coil and wherein said moving inductor means comprises an inductor coil.

32. An arrangement as defined in claim 25, wherein said input signal applied by said first stationary means to said temperature-responsive circuit is a periodic signal having a period substantially shorter than the time required for said moving inductor means to move past said stationary inductor means.

33. An arrangement as defined in claim 25, wherein said measuring means comprises an amplitude measuring means operative for measuring the amplitude of the response of said second means to said temperature-dependent output signal.

34. An arrangement as defined in claim 25, wherein said temperature-responsive circuit includes a temperature-responsive element located on said object.

35. An arrangement as defined in claim 34, wherein said temperature-responsive element is a thermistor.

36. An arrangement as defined in claim 25, wherein said temperature-responsive circuit comprises a further moving inductor means, and a temperature-dependent element connected in series with the two moving inductor means to form a closed series circuit.

37. An arrangement for measuring the temperature of an object mounted for movement in a predetermined manner but subject to dimensional variations with respect to at least one dimension thereof due to thermal expansion and contraction, comprising, in combination, a temperature-responsive circuit at least part of which is located on said object and including moving inductor means; stationary first means for applying an input signal to said temperature-responsive circuit to cause the same to generate a temperature-dependent output signal; stationary second means responsive to said temperature-dependent output signal, and including measuring means for determining the temperature of said object by measuring the response of said second means to said temperature-dependent output signal, at least one of said first and second means comprising stationary inductor means; and temperature-responsive supporting means connecting said moving inductor means to said object for movement with the latter along a predetermined path of motion and supporting said moving inductor means at such an orientation with respect to said stationary inductor means that upon movement of said object in said predetermined manner said moving inductor means passes by said stationary inductor means to establish inductive coupling between said moving and stationary inductor means, said temperature-responsive supporting means being automatically operative when said object undergoes a dimensional change with respect to said at least one dimension for altering the orientation of said moving inductor means with respect to said object in such a manner as to tend to maintain constant the maximum coupling between said stationary and moving inductor means, wherein said stationary inductor means is part of said second means, and wherein said first means includes a pair of spaced permanent magnets, and wherein said temperature-responsive circuit includes a further moving inductor means mounted for movement with said object in a predetermined path of motion so oriented with respect to said magnets that when said object moves in said predetermined manner said further moving inductor means moves through the space between said two magnets.

38. An arrangement as defined in claim 37, wherein the magnetic field between said two magnets in the region through which said further moving inductor means passes is substantially homogeneous.

39. An arrangement as defined in claim 37, wherein said further moving inductor means is so mounted for movement with said object that a change in the orientation of the path of motion of said further moving inductor means due to a dimensional change of said object causes said further moving inductor means to pass closer to one of said magnets than to the other of said magnets.

40. An arrangement as defined in claim 37, wherein said two permanent magnets constitute means for establishing in the first-mentioned one of the two moving inductor means of said temperature-responsive circuit a flux-producing current, the first-mentioned one of the two moving inductor means of said temperature-responsive circuit accordingly carrying flux-producing current and generating a voltage across said stationary inductor means when passing by said stationary inductor means, and wherein said measuring means comprises means for rectifying and integrating the voltage generated across said stationary inductor means.

41. An arrangement as defined in claim 25, wherein said object is a drying cylinder of a paper-making machine.

42. An arrangement for measuring the temperature of an object mounted for movement in a predetermined manner but subject to dimensional variations in at least one dimension thereof due to thermal expansion and contraction, comprising, in combination, a temperature-responsive circuit at least part of which is located on said object and including inductor means; stationary first means for applying an input signal to said temperature-responsive circuit to establish a flow of temperature-dependent current through said inductor means; stationary second means responsive to the flux produced by said current, and including measuring means for determining the temperature of said object by measuring the response of said second means to said flux, and including stationary flux-responsive means; and temperature-responsive supporting means on said object connecting said inductor means to said object for movement with the latter along a predetermined path of motion and supporting said inductor means with such an orientation with respect to said flux-responsive means that upon movement of said object in said predetermined manner said inductor means moves into the operative range of said flux-responsive means, said temperature-responsive supporting means being automatically operative when said object undergoes a dimensional change in at least one direction with respect to said at least one dimension for moving said inductor means relative to said object in the direction opposite to said at least one direction to tend to maintain constant the orientation of said inductor means relative to said flux-responsive means during the time when the former moves into the operative range of the latter.

* * * * *